United States Patent [19]

Fink

[11] 4,071,137
[45] Jan. 31, 1978

[54] WALKING BEAM CONVEYOR APPARATUS AND METHOD OF OPERATING THE SAME

[75] Inventor: Richard A. Fink, Auburn, Ind.

[73] Assignee: Auburn Foundry, Inc., Auburn, Ind.

[21] Appl. No.: 750,116

[22] Filed: Dec. 13, 1976

[51] Int. Cl.² .............................................. B65G 25/04
[52] U.S. Cl. .................................... 198/774; 198/955; 214/1 BE
[58] Field of Search ............... 198/750, 774, 775, 811, 198/955; 308/DIG. 1; 214/1 BE

[56] References Cited

U.S. PATENT DOCUMENTS

| | | | |
|---|---|---|---|
| 3,221,870 | 12/1965 | Pagay | 198/774 |
| 3,355,008 | 11/1967 | Milazzo | 198/774 |
| 3,513,934 | 5/1970 | Crowley | 214/1 BE |
| 3,757,931 | 9/1973 | Baker et al. | 214/1 BE |
| 3,815,726 | 6/1974 | Klein | 198/774 |
| 3,881,595 | 5/1975 | Deve | 198/750 |

*Primary Examiner*—Evon C. Blunk
*Assistant Examiner*—Joseph E. Valenza
*Attorney, Agent, or Firm*—Gust, Irish, Jeffers & Rickert

[57] ABSTRACT

Walking beam-type conveyor apparatus having a plurality of elongated, spaced stationary members carried by a supporting frame, and a plurality of elongated, spaced longitudinally movable members parallel with and intermediate the stationary members and carried by a longitudinally movable frame. Inflatable fluid bearings support the movable frame on the stationary frame for longitudinal movement of the movable frame and movable members between first and second positions. A selectively actuable valve has a first position in which fluid under a first predetermined pressure is applied to the fluid bearings during movement of the movable frame and movable members in one direction from the first to the second positions thereof, the first pressure being such that the movable members apply sufficient force to the load thereon that the load and movable members are moved in unison in the one direction. The valve has a second position in which it supplies fluid under a second predetermined pressure to the fluid bearings during movement of the movable frame and movable members in the opposite direction from the second to the first position thereof, the second pressure being lower than the first pressure and such that the load remains supported on the stationary members at the position to which it was previously moved while the movable frame and movable members are moved in the opposite direction. Means are provided for longitudinally moving the movable frame and movable members at least in the opposite direction from the second to the first position thereof.

24 Claims, 12 Drawing Figures

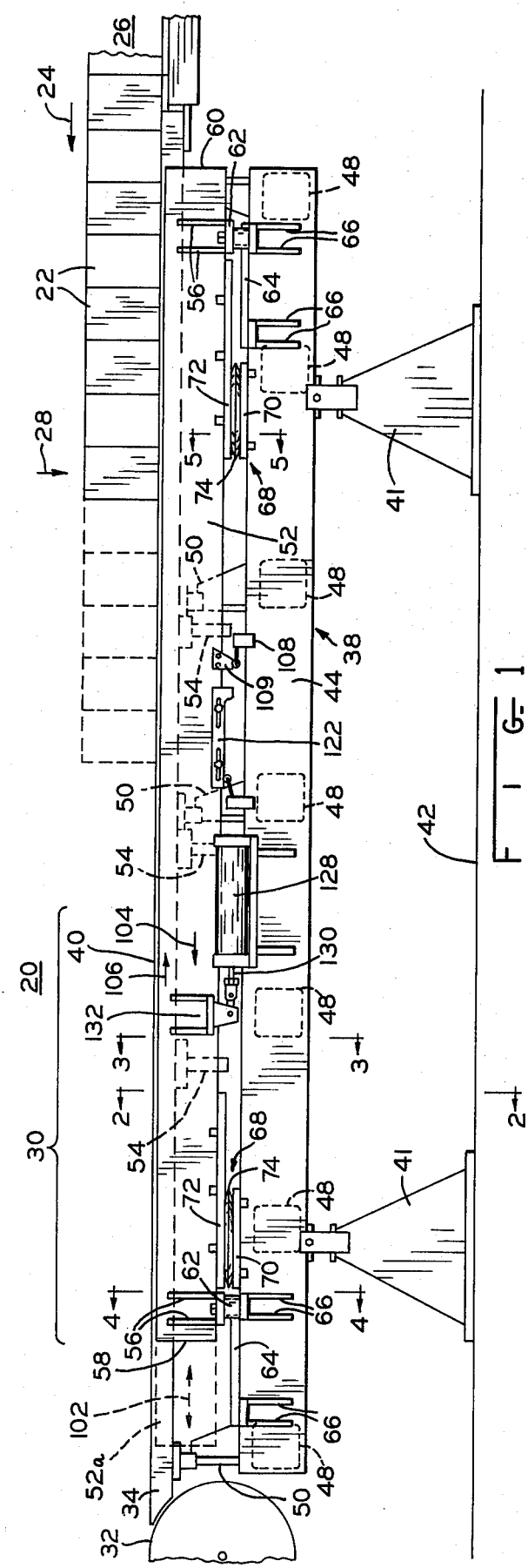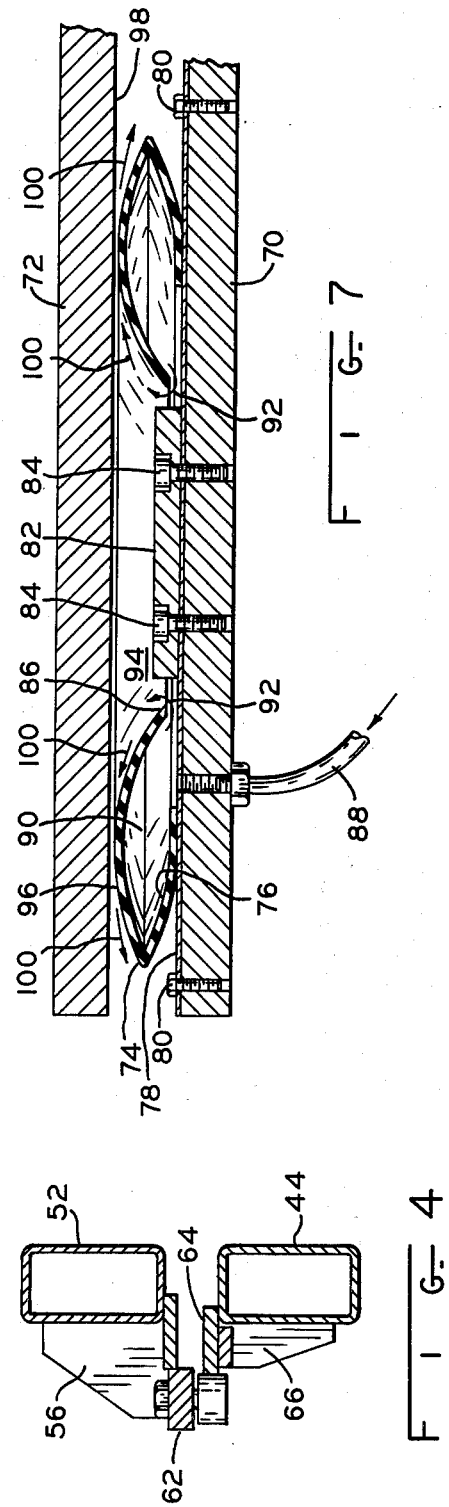

WALKING BEAM CONVEYOR APPARATUS AND METHOD OF OPERATING THE SAME

BACKGROUND OF THE INVENTION

1. Field of the Invention

This invention relates generally to walking beam-type conveyor apparatus, and to a method for operating such apparatus.

2. Description of the Prior Art

Conventional walking beam conveyor apparatus includes a plurality of elongated, spaced, parallel stationary members and a plurality of elongated, spaced, parallel movable members interleaved with the stationary members, the movable members being moved in orbital fashion by means such as cams thereby causing step-by-step advance of articles along the length of the conveyor.

U.S. Pat. No. 3,881,595 discloses walking beam-type conveyor apparatus employed for intermittently advancing sand molds from a mold forming machine past a molten metal pouring station and then along a cooling zone. In the apparatus and method of that patent, the movable members are lifted by fluid power cylinders thereby to lift the molds off the stationary members, the movable members then being moved longitudinally from first to second positions by the application of longitudinal force to the molds thereon by the mold forming machine. When the movable members with the molds thereon have been moved to their second positions, they are lowered by the fluid power cylinders below the stationary members so that the molds are supported by the stationary members, and the movable members are then returned to their first positions by another fluid power cylinder.

SUMMARY OF THE INVENTION

In its broader aspects, the invention provides walking beam-type conveyor apparatus having at least one elongated, stationary member with means for supporting the same, and at least one elongated, longitudinally movable member adjacent and parallel with the stationary member. The stationary and movable members have upper surfaces which support loads to be conveyed thereon. Inflatable fluid bearing means are provided for supporting the movable member on the supporting means for longitudinal movement thereon between first and second positions. First means is provided for supplying fluid under a first predetermined pressure to the bearing means during movement of the movable member in one direction from the first to second position thereof, the first pressure being such that the movable member applies sufficient force to the load thereon that the load and the movable member are moved in unison in the one direction. Second means are provided for supplying fluid under a second predetermined pressure to the fluid bearing means during movement of the movable member in the opposite direction from the second to the first position thereof, the second pressure being lower than the first pressure and being such that the load remains supported on the stationary member at the position to which it was previously moved while the movable member is moved in the opposite direction. In one embodiment, force is applied by an external source to move the load and the movable member in unison in the one direction, and means is provided for moving the movable member in the opposite direction from its second to its first position. In another embodiment, means is provided for longitudinally moving the movable member in both directions.

The invention, in its broader aspects, also provides a method of operating a walking beam conveyor of the type having at least one elongated, stationary member with means for supporting the same, at least one elongated, longitudinally movable member adjacent and parallel with the stationary member, inflatable fluid bearing means being provided for supporting the movable member on the supporting means for longitudinal movement thereon between first and second positions. In accordance with the method, fluid under a first predetermined pressure is applied to the fluid bearing means during movement of the movable member in one direction from its first to its second position, the first pressure being such that the movable member applies sufficient force to the load thereon that the load and the movable member are moved in unison in the one direction. Fluid under a second predetermined pressure is applied to the fluid bearing means during movement of the movable means in the opposite direction from its second to its first position, the second pressure being lower than the first pressure and being such that the load remains supported on the stationary member at the position to which it was previously moved while the movable member is moved in the opposite direction. Means for longitudinally moving the movable member is actuated to move the movable member in the opposite direction from its second to its first position.

In the preferred embodiment of both the apparatus and method of the invention, the upper surfaces of the stationary and movable members remain substantially coplanar during movement of the movable member in both directions.

It is accordingly an object of the invention to provide improved walking beam conveyor apparatus.

Another object of the invention is to provide an improved method of operating walking beam conveyor apparatus.

The above-mentioned and other features and objects of this invention and the manner of attaining them will become more apparent and the invention itself will be best understood by reference to the following description of an embodiment of the invention taken in conjunction with the accompanying drawings.

BRIEF DESCRIPTION OF THE DRAWINGS

FIG. 1 is a side view showing the improved walking beam conveyor apparatus of the invention;

FIG. 4 is a fragmentary, cross-sectional view taken generally along the line 4—4 of FIG. 1;

FIGS. 7 is a fragmentary, cross-sectional view showing the inflatable fluid bearings employed in the apparatus of the invention;

DESCRIPTION OF THE PREFERRED EMBODIMENTS

Figure 2:
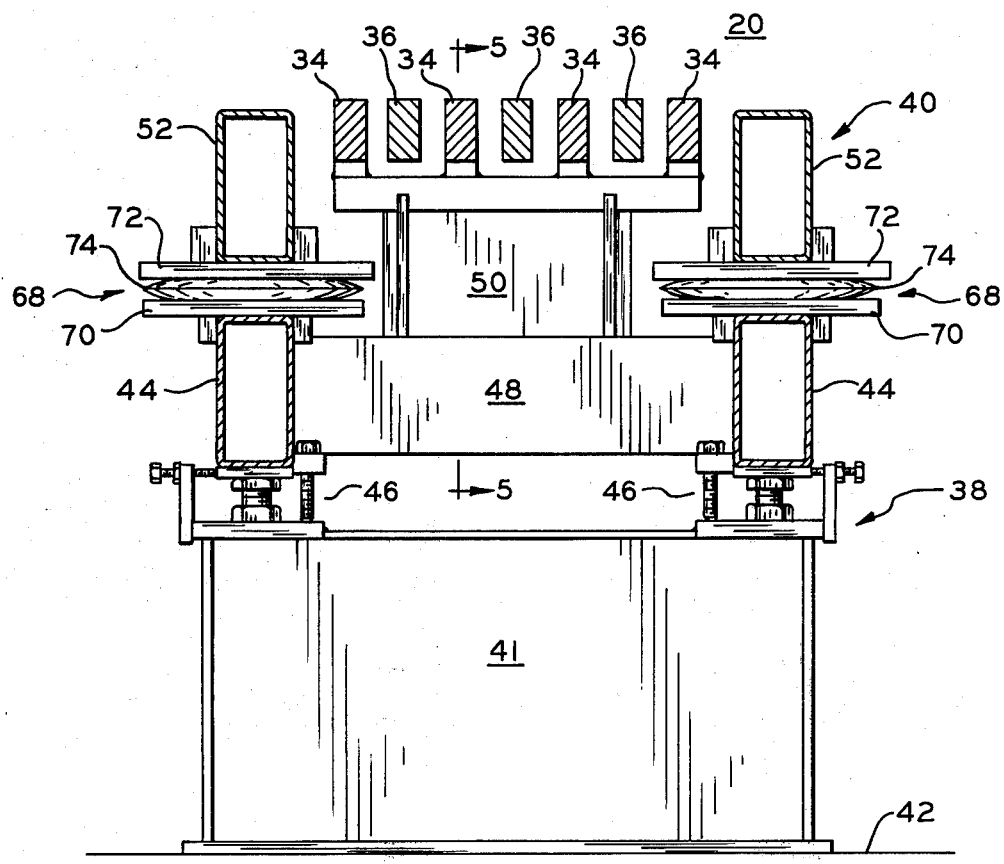
FIG. 2 is a cross-sectional view taken generally along the line 2—2 of FIG. 1.

Referring now to FIGS. 1-9 of the drawings, the improved walking beam conveyor apparatus of the invention, generally indicated at 20, may be employed for intermittently advancing sand molds 22 in the direction shown by the arrow 24 from an automatic mold forming machine 26 (otherwise not shown), such a the machine identified as Disamatic manufactured by Dansk Industri Syndikat A/S of Sweden, past a molten metal pouring station 28, along a cooling zone 30 to conventional conveyor 32.

Figure 3:
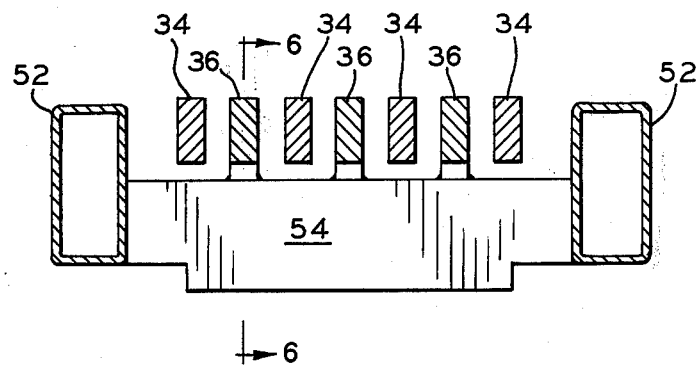
FIG. 3 is a cross-sectional view taken generally along the line 3—3 of FIG. 1.
Figure 5:
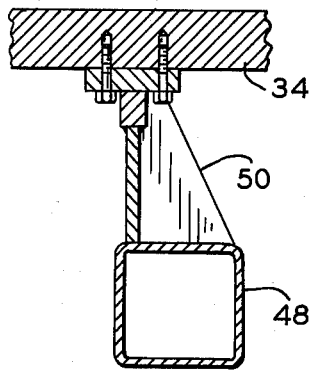
FIG. 5 is a fragmentary, cross-sectional view taken generally along the line 5—5 of FIG. 2.

Conveyor apparatus 20 comprises a plurality of elongated, spaced, parallel stationary members or bars 34, and a plurality of elongated, spaced, parallel movable members or bars 36 respectively intermediate stationary members 34 and in spaced, parallel relationship therewith, as best seen in FIGS. 2, 3 and 8A and 8B. Stationary members 34 are supported on stationary frame 38 while movable members 36 are supported on longitudinal movable frame 40. Frame 38 comprises support members 41 which support apparatus 20 on surface 42, spaced parallel side rail members 44 supported on support member 40 by leveling mechanisms 46, spaced parallel transverse members 48 extending between members 44, and upstanding members 50 respectively extending upwardly from members 48 and having stationary members 34 secured thereto, as best seen in FIGS. 3 and 5.

Figure 6:
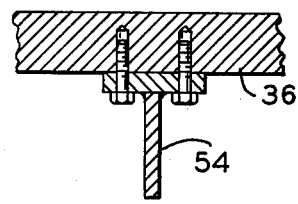
FIG. 6 is a fragmentary, cross-sectional view taken generally along the line 6—6 of FIG. 3.

Movable frame 40 comprises spaced, parallel side rail members 52 respectively in general vertical alignment with side rail members 44 and spaced, parallel connecting members 54 extending between members 52 and having movable members 36 secured thereto, as best seen in FIGS. 3 and 6. As seen in FIG. 1, transverse members 54 of movable frame 40 are disposed intermediate transverse members 50 of stationary frame 38.

As best seen in FIGS. 1 and 4, movable frame 40 is guided for longitudinal movement and restrained from lateral displacement by members 56 on movable side rail members 52 adjacent opposite ends 58, 60 thereof and having rollers 62 mounted thereon which cooperatively engage rails 64 secured to stationary side rail members 44 by members 66.

Figure 8A:
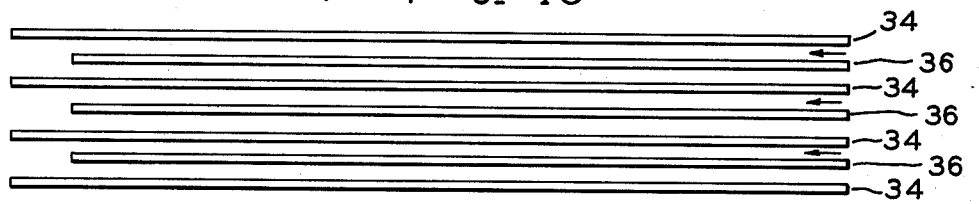
FIGS. 8A and 8B are top views of the apparatus of the invention showing the movable members in their first and second positions, respectively.
Figure 8B:
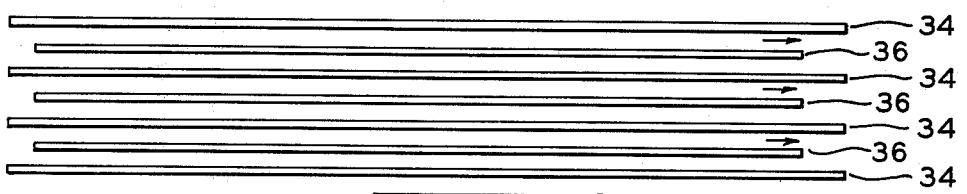

Movable frame 40 with movable bars 36 supported thereon is supported for longitudinal movement between a first position, as shown in FIGS. 1 and 8A, and a second position as shown in dashed lines at 52a in FIG. 1 and in FIG. 8B, by inflatable fluid bearing assemblies 68 adjacent opposite ends 58, 60 of movable side rail members 52. Referring particularly to FIG. 7, each fluid bearing assembly 68 comprises lower plate member 70 supported on and secured to a respective stationary side rail member 44, elongated movable plate member 72 secured to a respective movable side rail member 52, and inflatable element 74 formed of suitable resilient material, such as rubber or neoprene. Each inflatable element 74 is in the form of an annulus with lower section 76 secured to mounting plate member 78, as by suitable adhesive. Mounting plate 78 is secured to lower plate member 70, as by threaded fasteners 80. Plate member 82 in the center of inflatable element 74 is secured to mounting plate 78 and plate member 70, as by threaded fasteners 84, and serves as a fixed stop for supporting upper plate members 72 and movable frame 40 when inflatable elements 74 are completely deflated. Inner peripheral edge 86 of inflatable element 74 is normally biased into engagement with the upper surface of mounting plate 78 by the construction of inflatable element 74. Fluid line 88 extends through lower plate member 70 and mounting plate 78 and communicates with interior 90 of inflatable element 74. Line 88 is connected to a source of fluid under pressure, such as air, as will be described in connection with FIGS. 9 and 10. When fluid under pressure in line 88 is introduced to interior 90 of inflatable element 74, it inflates the same, as shown in FIG. 7, and bleeds past peripheral edge 86 into the interior of the annulus, as shown by arrows 92. The fluid under pressure bled into interior 94 of inflatable member 74 then bleeds over exterior surface 96 of inflatable member 74 past lower surface 98 of upper member 72 to the exterior, as shown by arrows 100, thus forming a fluid bearing which permits movable frame 40 to move longitudinally between first and second positions, as shown by arrows 102 in FIG. 1. In a physical embodiment of the invention, fluid bearings catalog No. ATP-512 manufactured by Air Techniques, Inc. of Addison, Illinois, were employed. That fluid bearing has a maximum rating capacity of 2,000 pounds, a maximum applied pressure of 25 pounds per square inch, a diameter of 12 inches, and an inflated thickness of 1-⅛ inch.

In accordance with the invention, fluid under a first predetermined pressure, such as 18 pounds per inch, is supplied to inflatable elements 74 of fluid bearings 68 during movement of movable frame 40 in the direction shown by arrow 104 from its first to its second position, that first predetermined pressure being such that inflatable elements 74 exert sufficient upward force on movable frame 40 and movable bars 36 (through the film of fluid 100) that molds 22 and movable members 36 move in unison in direction 104. In this embodiment, with movable frame 40 and movable bars 36 in the position shown in FIGS. 1 and 8A, and with the first predetermined fluid pressure applied to fluid bearings 68, mold forming machine 26 exerts force in direction 24 on molds 22 thus moving molds 22, movable members 36, and frame 40 in direction 104 from the first position of frame 40 to its second position, as shown in dashed lines at 52a in FIG. 1 and in FIG. 8B. When frame 40 and movable bars 36 have reached the second position, the pressure of the fluid applied to fluid bearings 68 is reduced to a lower level, such as 13 pounds per square inch, that second pressure being such that molds 22 remain supported on stationary members 34 in the position to which they were previously moved, while movable frame 40 and movable bars 36 are returned in the opposite direction as shown by the arrow 106 from the second position to the first position.

In accordance with an important feature of the invention, the upper surfaces of stationary and movable members 34, 36 remain substantially coplanar in both directions of movement 104, 106 of movable frame 40 and movable bars 36, the application of sufficient inflative force causing molds 22 and movable bars 36 to move in unison in direction 104, and the release of that force permitting molds 22 to remain in the positions to which previously moved while movable frame 40 and movable bars 36 move in direction 106, the walking beam action being provided by the difference in fluid pressure applied to fluid bearings 68.

Figure 9A:
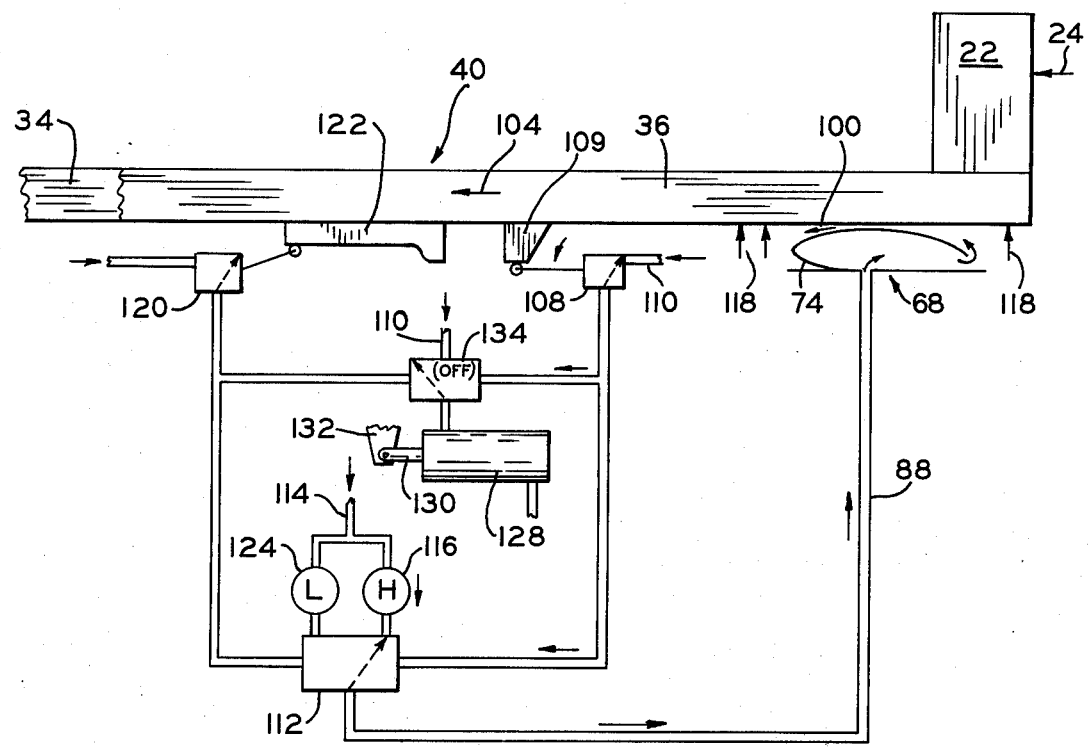
FIGS. 9A and 9B are schematic diagrams showing the mode of operation of the apparatus of the invention.
Figure 9B:
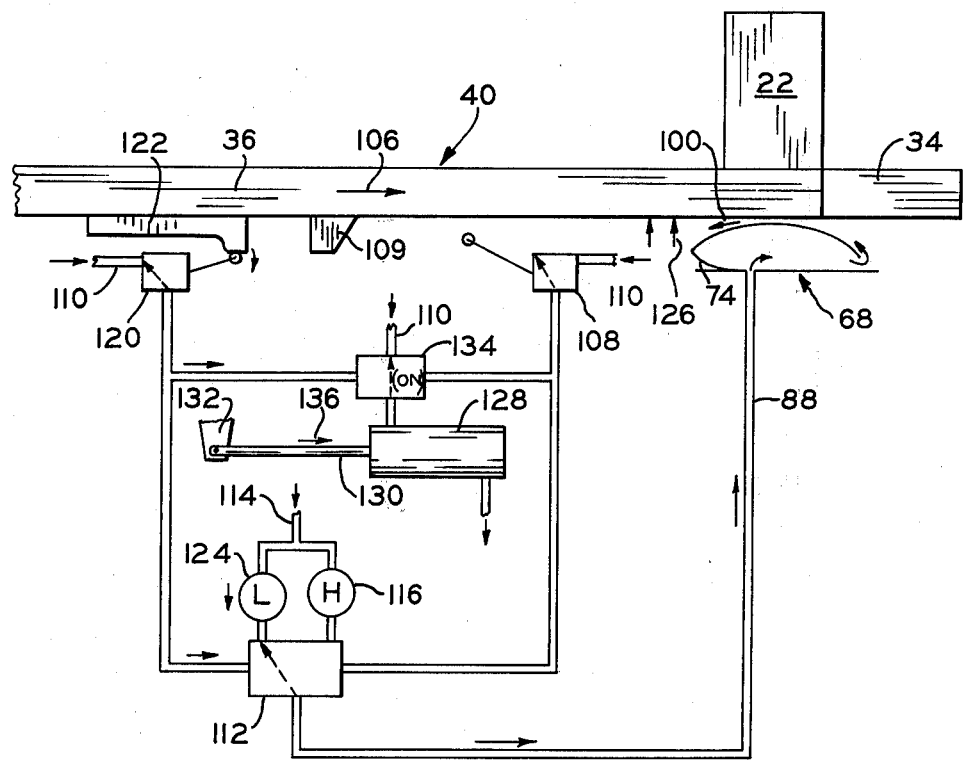

Referring now additionally to FIGS. 9A and 9B, the first position of movable frame 40 and movable members 36 is sensed by pilot valve 108 on one stationary side rail member 44 cooperating with fixed cam 109 on one movable side rail member 52. Pilot valve 108 connects fluid pressure source 110 to fluid pressure-actuated selecter valve 112 to actuate the same to connect line 88, which is connected to fluid bearings 68, to fluid pressure source 114 through high pressure regulator 116 which reduces the pressure of source 114 to the first predetermined fluid pressure, such as 18 pounds per square inch. Fluid bearings 68 thus exert force, as shown by arrows 118, on movable members 36 and load 22 such that an external force exerted on load 22, as shown by arrow 24, moves load 22 and movable members 36 in unison from the first position, as shown in FIG. 9A, to the second position, as shown in FIG. 9B.

The second position of movable frame 40 and movable members 36 is sensed by pilot valve 120 on one stationary side rail member 44 cooperating with adjustable cam 122 on one movable side rail member 52. Pilot valve 120, when actuated by cam 122, connects fluid pressure source 110 to actuate selector valve 112 to couple line 88 to fluid pressure source 114 through low pressure regulator 124 which reduces the pressure of source 114 to the second predetermined, lower pressure, such as 13 pounds per square inch, which, in turn, causes fluid bearings 68 to exert a lower force on movable members 36, as shown by arrows 126 in FIG. 9B.

Fluid power cylinders 128 mounted on stationary side rail members 44 have their piston rods 130 coupled to members 132 on movable side rail members 52. In this embodiment, fluid power cylinders 128 serve to return movable frame 40 and movable members 36 in direction 106 from the second position to the first position. Fluid power cylinders 128 are actuated by fluid pressure-actuated valve 134 which couples cylinder 128 to fluid pressure source 110. Actuation of pilot valve 108 by cam 110 in the first position of movable frame 40 and movable members 36, as shown in FIG. 9A, also couples fluid pressure source 110 to valve 134 to actuate the same to the "OFF" position thereby deactuating cylinder 128. Actuation of pilot valve 120 by cam 122 in the second position of movable frame 40 and movable members 36 also couples fluid pressure source 110 to valve 134 thereby to actuate valve 134 to the "ON" position thereby coupling cylinder 128 to fluid pressure source 110 so as to retract piston rod 130 in the direction shown by arrow 136 thereby moving movable frame 40 and movable members 36 in direction 106 from the second position to the first position thereof.

Figure 10:
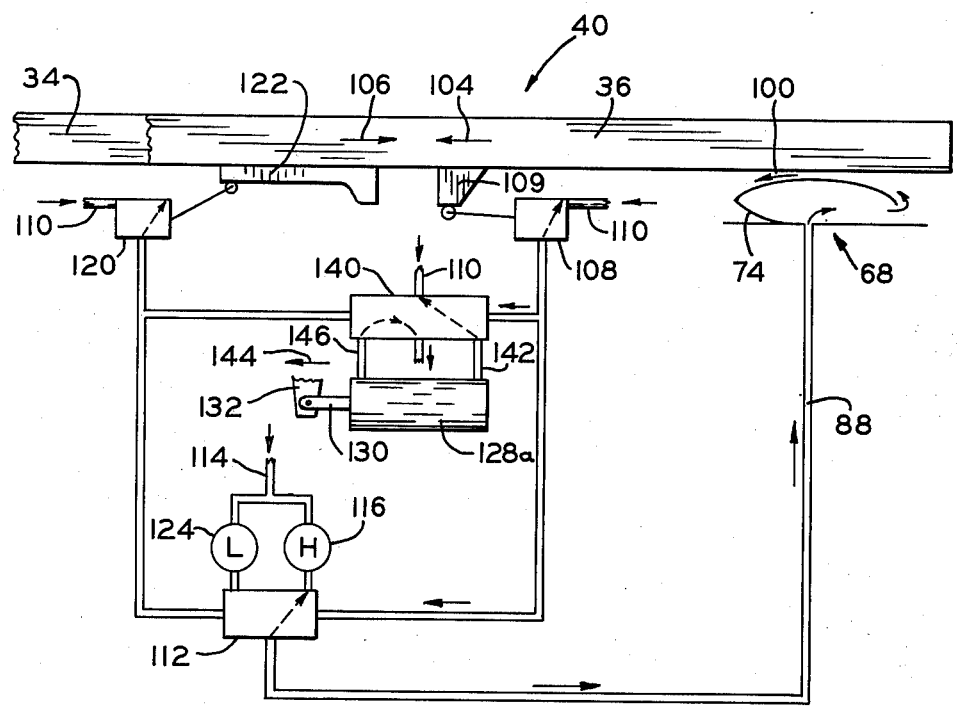
FIG. 10 is a schematic diagram showing another embodiment of the apparatus and method of the invention.

Referring now to FIG. 10 in which like elements are indicated by like reference numerals, it may be desirable in some applications to power movable frame 40 and movable members 36 in the forward direction 104 as well as in the reverse direction 106. In this embodiment, double-acting fluid power cylinder 128a is substituted for the single-acting cylinder 128 of the previous embodiment, and selector valve 140 is substituted for valve 134 of the previous embodiment. Thus, when movable frame 40 and movable members 36 are in the first position, as shown in FIG. 10, actuation of pilot valve 108 by cam 109 couples fluid pressure source 110 to valve 140 to actuate the same to couple input port 142 of cylinder 128 to fluid pressure source 110 thereby to cause extension of piston rod 130 in the direction shown by arrow 144 thereby to move movable frame 40 and movable members 36 in direction 104. Actuation of pilot valve 120 by cam 122 in the second position of movable frame 40 and movable members 36 couples fluid pressure source 110 to valve 140 to actuate the same to couple source 110 to port 146 of cylinder 128a thereby to cause retraction thereof and to move movable frame 40 and movable members 36 in the opposite direction 106, as above described.

While the apparatus and method of the invention have been specifically disclosed and described in connection with the intermittent advancement of sand molds from an automatic mold forming machine, it will be readily understood that the apparatus and method of the invention are equally applicable to the intermittent or step-by-step advancement of other articles from one end of the conveyor to the other.

While there have been described above the principles of this invention in connection with specific apparatus, it is to be clearly understood that this description is made only by way of example and not as a limitation to the scope of the invention.

WHAT IS CLAIMED IS:

1. In walking beam-type conveyor apparatus having at least one elongated, stationary member, means for supporting said stationary member, and at least one elongated, longitudinally movable member adjacent and parallel with said stationary member, said members having upper surfaces for supporting a load thereon, the improvement comprising: inflatable fluid bearing means for supporting by a film of escaping fluid said movable member on said supporting means for longitudinal movement thereon between first and second positions; first means for supplying fluid under a first predetermined pressure to said bearing means during movement of said movable member in one direction from said first to said second position thereof, said first pressure being such that said movable member applies sufficient force to the load thereon that said load and movable member are moved in unison in said one direction; second means for supplying fluid under a second predetermined pressure to said fluid bearing means during movement of said movable member in the opposite direction from said second to said first position thereof, said second pressure being lower than said first pressure and being such that said load remains supported on said stationary member at the position to which it was previously moved while said movable member is moved in said opposite direction; and means for longitudinally moving said movable member at least in said opposite direction from said second to said first position thereof.

2. The apparatus of claim 1 wherein said load is adapted to be moved in said one direction by an external force applied thereto thereby moving said movable member in said one direction.

3. The apparatus of claim 1 wherein said moving means selectively moves said movable member in both said directions.

4. The apparatus of claim 1 wherein said upper surfaces of said stationary and movable members are substantially coplanar during movement of said movable member in both said directions.

5. The apparatus of claim 1 wherein there are a plurality of said stationary and movable members, each stationary member being adjacent and parallel with at least one movable member.

6. The apparatus of claim 5 wherein there are a plurality of said fluid bearing means.

7. The apparatus of claim 6 wherein said supporting means comprises a first frame including first and second elongated, spaced parallel support members having opposite ends; and further comprising a second frame for supporting said movable members and movable therewith and including third and fourth elongated, spaced, parallel support members having opposite ends, said first and second frames being in spaced, generally vertical alignment, said fluid bearing means being disposed between said first and second frames.

8. The apparatus of claim 7 wherein said first frame further includes a plurality of spaced first transverse members connecting said first and second support members and having said stationary members secured thereto, and said second frame further includes a plurality of spaced second transverse members intermediate said first transverse members connecting said second and fourth support members and having said movable members secured thereto, said fluid bearing means being respectively disposed between said first and second and said third and fourth support members adjacent said opposite ends thereof.

9. The apparatus of claim 8 further comprising means on one of said frames and cooperating with the other frame for guiding longitudinal movement and for restraining lateral movement thereof with respect to said first frame.

10. The apparatus of claim 9 wherein said guiding and restraining means comprises members on support members of one of said frame and respectively having rollers thereon engaging guide members on said support members of the other of said frames.

11. The apparatus of claim 9 wherein said moving means comprises fluid power cylinders on one of said frames and operatively connected to the other of said frames.

12. The apparatus of claim 11 wherein said fluid power cylinders are respectively mounted on said first and second support members and respectively operatively connected to said third and fourth support members.

13. The apparatus of claim 11 further comprising first means for sensing said first position of said second frame and movable members, and first means responsive to said first sensing means for actuating said first fluid pressure supplying means to supply said first pressure to said fluid bearing means; and second means for sensing said second position of said second frame and movable members, and second means responsive to said second sensing means for actuating said second fluid pressure supplying means to supply said second pressure to said fluid bearing means.

14. The apparatus of claim 13 wherein said first and second sensing means respectively comprise first and second pilot valves on one of said frames and cooperating cam elements on the other of said frames; and further comprising fluid-actuated valve means for selectively coupling said first and second fluid pressure supplying means to said fluid bearing means, said first and second actuating means comprising means for coupling said first and second pilot valves to said valve means for actuating the same.

15. The apparatus of claim 14 further comprising third means responsive to said second sensing means for actuating said fluid power cylinders to move said second frame in said second direction from said second to said first positions thereof.

16. The apparatus of claim 15 further comprising second fluid-actuated valve means for selectively coupling said fluid power cylinders to a source of fluid under pressure, said third actuating means comprising means for coupling said second pilot valve to said second valve means for actuating the same to couple said source to said cylinders, said first pilot valve being coupled to said second valve means for actuating the same to disconnect said source from said cylinders.

17. The apparatus of claim 15 further comprising fourth means responsive to said first sensing means for actuating said fluid power cylinders to move said second frame in said one direction from said first to said second positions thereof.

18. The apparatus of claim 17 further comprising second fluid-actuated valve means for selectively coupling said power cylinders to a source of fluid under pressure, said third and fourth actuating means comprising means for coupling said first and second pilot valves to said second valve means for actuating the same to couple said source to said cylinders thereby to cause movement of said second frame in said one direction in response to operation of said first pilot valve, and for actuating said second valve means to couple said source to said cylinders thereby to cause movement of said second frame in said other direction in response to operation of said second pilot valve.

19. The method of operating a walking beam-type conveyor having at least one elongated, stationary member and means for supporting the same, at least one elongated, longitudinally movable member adjacent and parallel with said stationary member, inflatable fluid bearing means for supporting by a film of escaping fluid said movable member on said supporting means for longitudinal movement thereon between first and second positions, and means for longitudinally moving said movable member, comprising the steps of: applying fluid under a first predetermined pressure to said fluid bearing means during movement of said movable member in one direction from said first to said second position thereof, said first pressure being such that said movable member applies sufficient force to the load thereon that said load and movable member are moved in unison in said one direction; applying fluid under a second predetermined pressure to said fluid bearing means during movement of said movable means in the opposite direction from said second to said first position, said second pressure being lower than said first pressure and being such that said load remains supported on said stationary member at the position to which it was previously moved while said movable member is moved in said opposite direction; and actuating said moving means to move said movable member in said opposite direction from said second to said first position thereof.

20. The method of claim 19 comprising the further step of applying force to said load in said one direction thereby moving said movable member in said one direction from said first to said second position thereof.

21. The method of claim 19 comprising the further step of actuating said moving means to move said movable member in said one direction from said first to said second position thereof.

22. The method of claim 19 comprising the further steps of sensing said first position of said movable member and applying said first pressure to said fluid bearing means in response thereto, and sensing said second position of said movable member and applying said second pressure to said fluid bearing means and actuating said moving means in response thereto.

23. The method of claim 22 comprising the further step of actuating said moving means to move said movable member in said one direction from said first to said second position thereof in response to said first-mentioned sensing step.

24. The method of claim 19 wherein said stationary and movable members are maintained substantially coplanar during movement of said movable member in both said directions.

* * * * *